(12) United States Patent
Lipson et al.

(10) Patent No.: US 9,294,667 B2
(45) Date of Patent: Mar. 22, 2016

(54) MEMS AUTO FOCUS MINIATURE CAMERA MODULE WITH FIXED AND MOVABLE LENS GROUPS

(71) Applicant: DigitalOptics Corporation, San Jose, CA (US)

(72) Inventors: Ariel Lipson, Tel-Aviv (IL); Uri Kinrot, Tel-Aviv (IL); Dalit Bahar, Tel-Aviv (IL); Moshe Kriman, Tel-Aviv (IL); Moshe Levy, Tel-Aviv (IL); Ocie Ward, Petaluma, CA (US); Mark Harland, Hilton, NY (US)

(73) Assignee: DigitalOptics Corporation, San Jose, CA (US)

( * ) Notice: Subject to any disclaimer, the term of this patent is extended or adjusted under 35 U.S.C. 154(b) by 215 days.

(21) Appl. No.: 13/888,349

(22) Filed: May 6, 2013

(65) Prior Publication Data

US 2013/0293764 A1 Nov. 7, 2013

Related U.S. Application Data

(63) Continuation-in-part of application No. 13/792,132, filed on Mar. 10, 2013.

(60) Provisional application No. 61/643,331, filed on May 6, 2012, provisional application No. 61/609,293, filed on Mar. 10, 2012, provisional application No. 61/643,331, filed on May 6, 2012.

(51) Int. Cl.
*H04N 5/232* (2006.01)
*H04N 5/225* (2006.01)
*G03B 3/10* (2006.01)
*G02B 7/08* (2006.01)
*G02B 13/00* (2006.01)

(52) U.S. Cl.
CPC .............. *H04N 5/23212* (2013.01); *G02B 7/08* (2013.01); *G03B 3/10* (2013.01); *H04N 5/2254* (2013.01); *H04N 5/2257* (2013.01); *G02B 13/001* (2013.01); *G02B 13/009* (2013.01); *G03B 2205/0046* (2013.01); *G03B 2205/0053* (2013.01); *Y10T 29/49002* (2015.01)

(58) Field of Classification Search
CPC .............. H04N 5/2254; H04N 5/2257; H04N 5/23212; G02B 13/001; G02B 13/009; G02B 7/08; G02B 2205/0036; G02B 2205/0053; G02B 3/10; Y10T 29/49002
USPC ........................................................ 348/345
See application file for complete search history.

(56) References Cited

U.S. PATENT DOCUMENTS

| 5,066,113 | A | * | 11/1991 | Nakajima et al. ............. 359/649 |
| 6,731,339 | B2 | | 5/2004 | Ohkawara |
| 7,269,344 | B2 | | 9/2007 | Nishioka et al. |
| 7,556,433 | B2 | | 7/2009 | Kurimura et al. |
| 7,693,409 | B2 | | 4/2010 | Morimoto |
| 7,719,605 | B2 | | 5/2010 | Hirasawa et al. |
| 8,436,286 | B2 | * | 5/2013 | Olsen et al. ................. 250/201.2 |
| 2002/0047912 | A1 | | 4/2002 | Mabuchi et al. |

(Continued)

*Primary Examiner* — Amy Hsu
(74) *Attorney, Agent, or Firm* — Haynes and Boone, LLP

(57) ABSTRACT

A MEMS auto focus miniature camera module includes an image sensor and an optical train including at least one movable lens and one or more fixed lenses or fixed lens groups on either side of the movable lens. The movable lens provides an auto focus feature of the camera module. A MEMS actuator translates the movable lens through an auto focus range to adjust focus.

34 Claims, 6 Drawing Sheets

(56) References Cited

U.S. PATENT DOCUMENTS

| | | | |
|---|---|---|---|
| 2002/0131170 A1* | 9/2002 | Costales | 359/464 |
| 2003/0130562 A1* | 7/2003 | Barbato et al. | 600/109 |
| 2007/0041721 A1* | 2/2007 | Ito et al. | 396/55 |
| 2007/0053672 A1 | 3/2007 | Westerweck et al. | |
| 2007/0278536 A1* | 12/2007 | Adachi | 257/239 |
| 2008/0174690 A1 | 7/2008 | Chang | |
| 2009/0015706 A1 | 1/2009 | Singh | |
| 2009/0066832 A1 | 3/2009 | Hirasawa et al. | |
| 2009/0295936 A1* | 12/2009 | Ohkuma | 348/222.1 |
| 2010/0177238 A1* | 7/2010 | Saito | 348/374 |
| 2010/0238328 A1* | 9/2010 | Pillman et al. | 348/241 |
| 2010/0309364 A1* | 12/2010 | Brunner et al. | 348/345 |
| 2010/0321535 A1* | 12/2010 | Rodriguez et al. | 348/240.2 |
| 2011/0013062 A1* | 1/2011 | Yamashita | 348/294 |
| 2011/0157429 A1* | 6/2011 | Matsunaga et al. | 348/240.3 |
| 2011/0273611 A1* | 11/2011 | Matsusaka et al. | 348/345 |
| 2012/0081596 A1* | 4/2012 | Tanaka et al. | 348/340 |
| 2012/0099005 A1* | 4/2012 | Kali et al. | 348/240.99 |
| 2012/0105710 A1* | 5/2012 | Itoh et al. | 348/345 |
| 2012/0200764 A1 | 8/2012 | Afshari et al. | |
| 2012/0200768 A1 | 8/2012 | Ito | |
| 2012/0229667 A1* | 9/2012 | Tsunekawa | 348/222.1 |
| 2012/0281132 A1* | 11/2012 | Ogura et al. | 348/348 |
| 2012/0307089 A1* | 12/2012 | Rukes | 348/208.99 |
| 2012/0320257 A1* | 12/2012 | Shabtay et al. | 348/349 |

* cited by examiner

MEMS AUTO FOCUS MINIATURE CAMERA MODULE WITH FIXED AND MOVABLE LENS GROUPS

PRIORITY AND CROSS-REFERENCE TO RELATED APPLICATIONS

This application claims the benefit of priority under 35 USC §119 to U.S. provisional patent application No. 61/643,331, filed May 6, 2012; which is incorporated by reference; and this application is a continuation-in-part (CIP) of U.S. patent application Ser. No. 13/792,132, filed Mar. 10, 2013, which claims priority under 35 USC §119 to U.S. provisional patent application No. 61/609,293, filed Mar. 10, 2012; which is incorporated by reference; and This application is related to a series of applications filed on Mar. 10, 2013, including application Ser. No. 13/792,132, entitled, MINIATURE CAMERA MODULE WITH MEMS-ACTUATED AUTOFOCUS; application Ser. No. 13/792,137, entitled, MINIATURE MEMS AUTOFOCUS ZOOM CAMERA MODULE; application Ser. No. 13/792,139, entitled, CAMERA MODULE WITH MEMS AUTOFOCUS AND ZOOM; application Ser. No. 13/792,140, entitled, MEMS AUTOFOCUS CAMERA MODULE WITH ALIGNMENT REGISTRATION; application Ser. No. 13/792,145, entitled, CAMERA MODULE WITH PROCESSOR-BASED MEMS-ACTUATED AUTOFOCUS; application Ser. No. 13/792,147, entitled, MEMS AUTOFOCUS CAMERA MODULE WITH MULTIPLE LENS GROUPS; application Ser. No. 13/792,148, entitled, MEMS AUTOFOCUS CAMERA MODULE WITH FIXED AND MOVABLE LENS GROUPS; application Ser. No. PCT/GB2013/050588, entitled, MINIATURE CAMERA MODULE WITH MEMS-ACTUATED AUTOFOCUS; and This application is related to a series of applications filed on May 6, 2013, including application Ser. No. 13/888,349, entitled, "MEMS AUTO FOCUS MINIATURE CAMERA MODULE WITH FIXED AND MOVABLE LENS GROUPS"; application Ser. No. 13/888,363, entitled, "MEMS AUTO FOCUS MINIATURE CAMERA MODULE WITH ABUTTING REGISTRATION"; each of which are incorporated by reference.

BACKGROUND

A camera is a device for capturing images. A traditional camera uses film and photographic paper as the capture medium. More recently, the electronic camera has been invented that permits the capture of images in electronic form, principally as files that can be read, processed and displayed by other electronic devices.

An electronic camera comprises two principal components. These are an optical train and an image sensor. The optical train typically contains a plethora of optical active elements including, but not limited to baffles, lenses, apertures, stops, mirrors and the alike. The function of the optical train is to capture light from the scene of interest and focus it on to the image sensor with high fidelity. That is, without too much distortion, aberration, blurring, ghosting or any of the multiplicity of optical artefacts that are known and which serve to degrade the fidelity of the captured image. The image sensor is an electro-optic component, commonly made of silicon. The operation of such components typically involves dividing the focused image into a large number of microscopic portions and recording the colour and illumination intensity of each. The image sensor then processes this information to output a representation of the image in an electronic form. Often these forms are defined by Standards, such as JPEG, permitting them to be readily processed and displayed by other electronic devices.

Electronic cameras come in essentially two flavours. These are fixed optic and variable optic. In a fixed optic camera all the elements of the optical train are fixed in functionality and location in the camera at the time of manufacture. This means the performance of the optical train and hence the camera is invariant. Because the primary function of any camera is to capture focused images, cameras of this type are often referred to as 'fixed focus'. Typically the focus of a fixed focus camera is set at about 1.2 m from the camera. This means that all objects in the range from 60 cm to many tens of metres away have acceptable fidelity in the captured image. In a variable optic camera, one or more elements of the optical train may be designed to permit variation in function, functionality or location. For example an aperture placed at the front of an optical train has a major influence on the quantity of light that reaches the image sensor and hence the brightness or darkness of the resulting image. By suitable adjustment of the aperture, one camera can produce images of good fidelity in conditions where the scene is brightly lit, for example in bright sunshine, and where it may be dimly lit, for example in moonlight.

Another example of a variable optic camera is one wherein the position of the entire optical train can be moved along the optical axis of the camera. This alters the focus of the camera permitting objects that are almost any distance from the camera to be captured with high fidelity. If the camera operator selects the focus distance by manual adjustment of the position of the optical train the camera is said to be 'manual focus'. Where an electronic system is used to measure the distance from the camera of the objects in the scene and is used in conjunction with an actuator to move the optical train, the camera is said to be 'auto focus'.

It has been found possible to combine many functions in a variable optic camera. Thus, for example, it is possible to purchase a camera that has simultaneous autofocus and zoom capability. However combination of functions like this inevitability results in an optical train of considerable complexity and consequentially size, weight, cost and poor reliability. Consequently improvements in autofocus zoom cameras are desirable and particularly for miniature cameras that are incorporated in portable electronics products such as mobile phones.

DETAILED DESCRIPTIONS OF THE EMBODIMENTS

Figure 1:
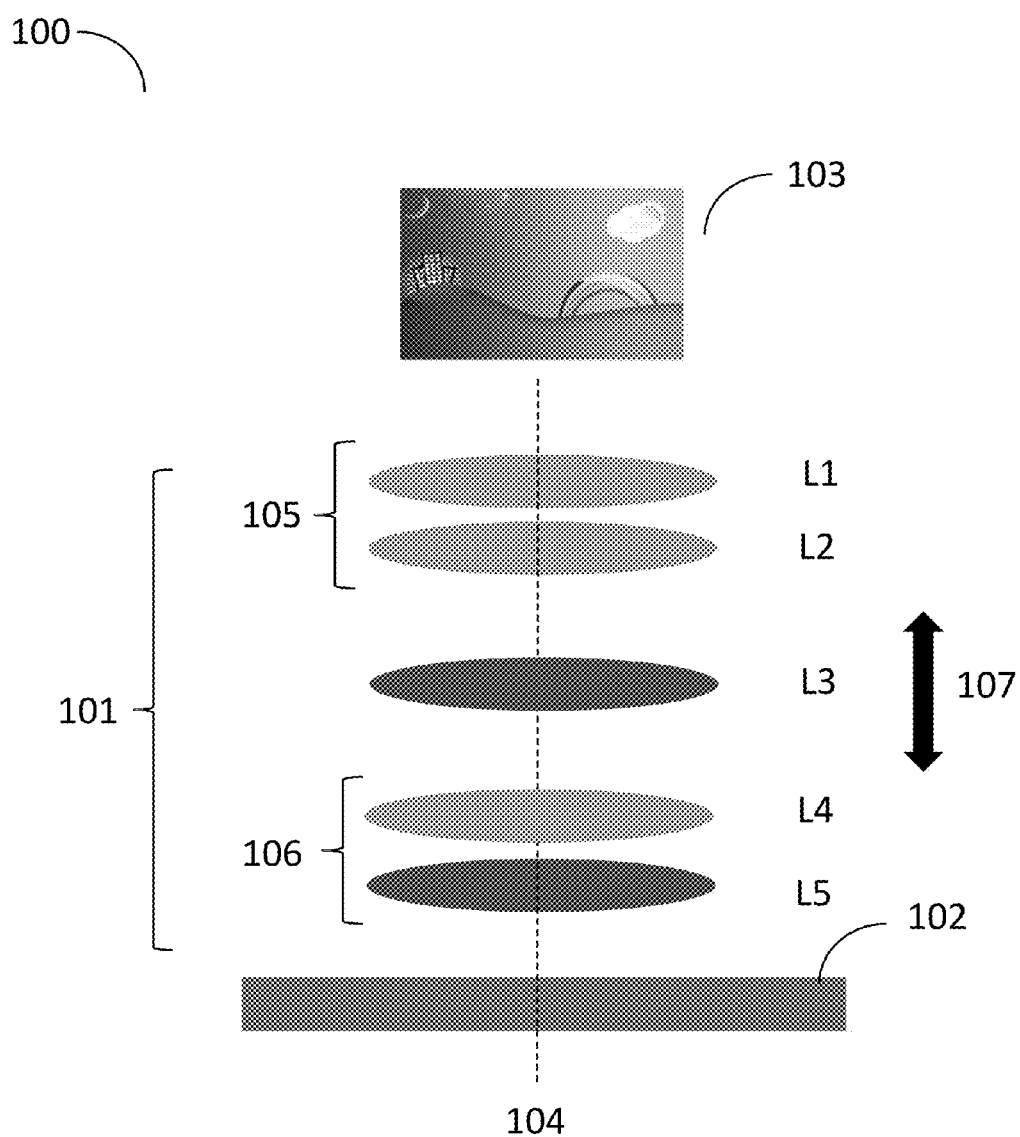
FIG. 1 is a schematic representation of a MEMS auto focus miniature camera module in accordance with certain embodiments.

An auto focus camera module and/or auto focus zoom camera module is provided that includes a camera module housing and an image sensor and optical train within the housing. The optical train includes multiple lenses configured to provide auto focus and zoom for the camera module, including a first fixed lens group, a second fixed lens group and a movable lens that is disposed between the first and second fixed lens groups. The movable lens is coupled to an actuator to move the movable lens relative to the image sensor and the first and second fixed lens groups in an auto focus zoom operation of the camera module. The first and/or second fixed lens groups may include one or two or more fixed lenses. In one embodiment, both fixed lens groups include a pair of fixed lenses.

An auto focus and/or auto focus zoom camera enabled embedded device is also provided. An embedded device housing contains a processor, a camera module and processor readable code for programming the processor to perform an auto focus operation. The camera module includes an image sensor and an optical train that at least includes a first fixed lens group nearest the image sensor and a second fixed lens group, and at least one movable lens disposed between the first and second fixed lens groups. The at least one movable lens is coupled to a MEMS actuator to move the movable lens relative to the image sensor and the first and second fixed lens groups in an auto focus operation of the camera module.

Another auto focus and/or auto focus zoom camera module is provided that includes a camera module housing and an image sensor and optical train within the housing. The optical train includes a first fixed lens group, a second fixed lens group, and at least one movable lens disposed between the first and second fixed lens groups. The at least one movable lens is coupled to an actuator, e.g., a MEMS actuator, to move the movable lens relative to the first and second fixed lens groups. The image sensor is aligned with the optical train. A processor-readable memory includes code for programming a processor to perform an auto focus operation. The first and second fixed lens groups may each include two fixed lenses.

A further auto focus and/or auto focus zoom camera module is provided that includes a camera module housing and an image sensor and an optical train within the housing. The optical train includes at least a first fixed lens group nearest the image sensor, a second fixed lens group, and a movable lens group disposed between the first and second fixed lens groups that is coupled to a MEMS actuator that is configured to move the movable lens group relative to the image sensor and the first and second fixed lens groups in an auto focus operation of the camera module.

The optical train may include an even number of fixed lenses. Each of the first and second fixed lens groups of the optical train may include two fixed lenses.

The first fixed lens group may include a zoom lens that is disposed closest to the image sensor within the optical train. The second fixed lens group may be disposed along the optical path on the object side of the movable lens, wherein the first fixed lens group includes the zoom lens L1 and another fixed lens L2 disposed on the sensor side of the movable lens L3. The second fixed lens group may include two fixed lenses L4 and L5 on the object side of the movable lens L3. The lens diameters may decrease from L1 to L3, and increase from L3 to L5, such that the movable auto focus lens L3 has the smallest diameter of the five lenses L1-L5 from object end to image end of the optical train. The lens L1 may be configured as a meniscus lens. The lens L2 may also be configured as a meniscus lens. The movable auto focus lens L3 may have a bi-convex lens design. The lens L4 may be configured as a complex bi-concave lens. The lens L5 may have a complex meniscus lens design. The optical train may include an optical stop on the image side of the lens L1, and there may be stops on the scene sides of each of lenses L3, L4 and L5. The stop on L3 may be configured to move in tandem with the lens.

A MEMS actuator may be configured to move a single lens L3 of the movable lens group relative to the image sensor, and fixed lenses L1 and L2 of the first fixed lens group and fixed lenses L4 and L5 of the second fixed lens group may also be fixed relative to the movable lens L3. A range of movement of the lens L3 may include approximately 50 μm to 350 μm, and the range of movement of the lens L3 may be in certain embodiments approximately 100 μm.

The optical train may have been fabricated as a unitary component within the housing. The housing may be configured with a screw thread permitting the focus of the camera to be set. The optical train may have been fabricated using passive and active alignment. The active alignment may have been used between the MEMS actuator and the third fixed lens L4.

A spacing between L2 and L3 may be provided within a range around approximately 100 μm to 300 μm, and the MEMS actuator may be configured to move the lens L3 along up to 90% of that spacing in an auto focus operation. The spacing in certain embodiments between L2 and L3 may be within a range around approximately 190 μm. A spacing between L5 and the image sensor may be within a range around approximately 500 μm to 1500 μm. The spacing between L5 and the image sensor is in certain embodiments within a range around approximately 900 μm.

An infrared cut filter may be spaced from L5 within a range around 5 μm to 1000 μm. The infrared cut filter may be spaced in certain embodiments from L5 within a range around approximately 250 μm.

A method of assembling an optical train for an auto focus and/or auto focus zoom camera module that includes five lenses (respectively referred to as "L1"-"L5" in a direction from object to image along the optical path) is also provided. The method may include in certain embodiments coupling L1 to L2; coupling L3 to a MEMS actuator; coupling L4 to L5; coupling the L1/L2 lens pair to the L3/MEMS assembly; and coupling the L1/L2/L3/MEMS assembly to the L4/L5 lens pair. In certain embodiments the lens L5 is fabricated together with an image sensor at the wafer level.

An auto focus MEMS camera module is also provided including an image sensor and an auto focus module including a MEMS actuator that is configured to move at least one movable lens along an optical axis of the camera module in an auto focus operation. The auto focus module includes a first fixed lens group nearest an object end of the optical path, and a second fixed lens group nearest the sensor end of the optical path. The second fixed lens group is spaced from the first fixed lens group at least 100 microns to permit the at least one movable lens to move through an auto focus range of the MEMS camera module.

The second fixed lens group may be spaced from the first fixed lens group approximately 190 microns or more to permit the at least one movable lens to move through an auto focus range of the MEMS camera module. The first and second fixed lens groups may each comprise two or more fixed lenses that are fixed in position relative to the image sensor or camera housing or a rigid substrate or combinations thereof.

An auto focus MEMS camera module in accordance with certain embodiments may include an image sensor, and an autofocus module including a MEMS actuator that is configured to move at least one movable lens in a spacing between first and second fixed lens groups along an optical axis of the camera module in an auto focus operation, wherein the image sensor may be disposed approximately at a back focal length of one or more fixed lenses of the second fixed lens group nearest the image sensor.

The one or more fixed lenses of the second lens group may be configured to compensate for a field curvature induced by the one or more moving lenses.

The one or more fixed lenses of the second lens group may be configured to match an associated point spread function to a pixel dimension of the image sensor approximately uniformly over an area of the image sensor.

The auto focus module may be configured such that an autofocus distance range comprises 10 cm to 9 meters. The autofocus distance range may be approximately 15 cm to 5 meters in certain embodiments. The auto focus module may be configured with an autofocus distance range between approximately 20 cm to 3 meters. The autofocus distance may exclude a hyperfocal distance.

The auto focus MEMS camera module and/or a camera module enabled embedded device may include a processor and a non-transitory processor readable storage device that has code embedded therein for programming the processor to perform an autofocus operation. The code may be configured to program the processor to correct for distortion or another artefact produced in a predictable manner by one or more optical elements of the auto focus module. The code may be configured to program the processor to process information from image sensor pixels irrespective of a number of pixels within an image area illuminated by the one or more optical elements. The code may be implemented in hardware or software or both.

The processor may be configured to perform the autofocus operation within an image processing pipeline on the image sensor. The processor may be configured to perform the autofocus operation on a discrete platform. The discrete platform may include an image processor. The discrete platform may include a baseband chip in a mobile phone.

The camera module and/or camera module enabled embedded device may include a machine readable file that has largely constant size and effective image resolution irrespective of autofocus setting. A zoom feature may range between x0.5 and x5. The zoom feature may range between x1 and x4. The zoom feature may range between x1 and x3. The camera module and/or camera module enabled device may include a movable lens housing containing the one or more movable lenses. The movable lens housing may be configured to be movable mechanically along the optical axis of the camera.

An auto focus MEMS camera module is also provided that includes an image sensor and an autofocus and/or auto focus zoom module. The auto focus module includes a MEMS actuator that is configured to move at least one movable lens along an optical axis of the camera module in an auto focus operation in a spacing between a first fixed lens group, nearest the image sensor, and a second fixed lens group, on the object end of the autofocus module. A first surface of a fixed lens of the first or second lens group and a second surface of the at least one movable lens are provided with one or more physical registration features configured to abut to aid alignment during assembly.

In operation of the autofocus and/or auto focus zoom module, a registration of de-center between the one or more fixed lenses of the first lens group or the second lens group, or both, and the one or more moving lenses may include approximately seven, five or three microns or less. A registration of tilt between the one or more fixed lenses of the first lens group or the second lens group, or both, and the one or more moving lenses may include approximately 0.3, 0.2, or 0.1 microns or less. The optical axis may be displaced from an axis of a movable lens group not more than approximately 500 µm, 200 µm, or 100 µm.

A MEMS auto focus zoom camera module is also provided that includes a movable lens group, first and second fixed lens groups disposed on either side of the movable lens group, an image sensor, and a memory having embedded therein code for programming a processor to modify acquired image data in accordance with an electronic zoom technique. The camera module may include an optical path that is not more than 8 mm. The movable lens group may include only a single movable lens. A processor may be included that is programmable in accordance with the embedded code. A fixed lens nearest the image sensor may be configured in accordance with the electronic zoom technique. The first and second fixed lens groups may include a same number of fixed lenses. The first and second fixed lens groups may each include two fixed lenses.

A method of assembly of a miniature camera module is also provided that includes abutting registration features of a first fixed lens group and one end of a movable lens group, affixing the movable lens group in location within a movable lens housing, including coupling a MEMS actuator to the movable lens group that is configured to move the movable lens group relative to the first fixed lens group in an auto-focus operation of the miniature camera module, and assembling an optical train including coupling a second fixed lens group at the other end the movable lens group.

The affixing may include applying an adhesive. The applying an adhesive may include joining the movable lens housing to a sleeve. The first fixed lens group may include first and second lenses. The method may further include assembling the first fixed lens group before abutting the first fixed lens group and the one end of the movable lens group. The second fixed lens group may include first and second lenses, and the method may further include assembling the second fixed lens group before coupling the second fixed lens group to the other end of the movable lens group.

A MEMS autofocus miniature camera module is also provided that includes one or both of a camera module housing or a rigid substrate that either defines an aperture or is coupled to an aperture, or both. An image sensor is coupled to the housing or rigid substrate. A first fixed lens group is coupled to the housing and is fixed relative to the image sensor. A MEMS actuator is coupled to the housing or rigid substrate. A movable lens group is coupled to the actuator and is movable relative to the image sensor. A second fixed lens group is coupled to the housing and is fixed relative to the image sensor or coupled directly to the image sensor.

A rigid substrate may be coupled to the camera module housing. A lens barrel may contain at least the first fixed lens group and the movable lens group. The MEMS actuator may be coupled to a single movable lens for moving the single movable lens along the optical path relative to the image sensor between the first and second fixed lens groups. The first and second fixed lens groups may each comprise one or two or more lenses. The movable lens group may include as few as a single lens. The first fixed lens group and/or the second fixed lens group may include two lenses.

The first and second fixed lens groups may be relatively disposed on either end of the movable lens group with a centering alignment within, e.g., 1, 3, 5 or 10 microns.

The first and second fixed lens groups may be relatively disposed on either end of the movable lens group with a tilt alignment within, e.g., 0.01°, 0.05°, 0.1°, 0.2°, 0.3°, or 0.4°.

The first and second fixed lens groups may be relatively disposed on either end of the movable lens group within a centering alignment in a range between of 1 micron and 10 microns or within a centering alignment in a range, e.g., between 2 microns and 5 microns.

The first and second fixed lens groups may be relatively disposed on either end of the movable lens group within a tilt alignment in a range, e.g., between 0.05° and 0.3°, or between 0.1° and 0.2°.

The focus travel length of the movable lens group may be, e.g., more than 50, 100, 150, 200, 250 or 300 microns, or within a range, e.g., between 100 microns and 300 microns, or between 50 microns and 500 microns.

The first fixed lens group may be disposed a distance from the sensor along the optical path within a range between around its back focal length±10 microns, or between, e.g., 700 and 1100 microns, or 500 and 1300 microns, may be approximately 900 microns. The first lens group and image sensor may be relatively disposed with a centering alignment within 90 microns, or in a range, e.g., between 40 microns and 140 microns.

A miniature MEMS autofocus camera module is provided that includes a MEMS actuated movable lens group and at least one fixed lens group defining an optical axis within a camera module housing within which objects disposed an arbitrary distance from the camera module are automatically focused at a determined zoom to an image sensor by MEMS actuation of the movable lens group to accomplish autofocus functionality.

The camera module may include a processor and embedded code for programming the processor to electronically zoom the image data. The electronic zoom may utilize both electronic and optical processing elements. The optical autofocus may also utilize both electronic and optical processing elements. One or more lenses may participate as a same electronic and optical processing element used for both the optical autofocus and the electronic zoom.

The at least one fixed lens group may include first and second lens groups. The movable lens group may be disposed between the first and second fixed lens groups.

An optical assembly for a miniature MEMS autofocus camera module is also provided including a MEMS actuated movable lens group and at least one fixed lens group defining an optical axis within a housing configured to couple with an image sensor component to capture digital images of objects disposed an arbitrary distance from the camera module that are automatically focused at a determined zoom to an image sensor portion of the image sensor component by MEMS actuation of the movable lens group to accomplish autofocus functionality.

The optical assembly may include contact pads for coupling with a processor programmed to electronically zoom the image data. The electronic zoom may utilize both electronic and optical processing elements. The optical autofocus may also utilize both electronic and optical processing elements. One or more lenses may participate as a same electronic and optical processing element used for both the optical autofocus and the electronic zoom.

The at least one fixed lens group may include first and second lens groups. The movable lens group may be disposed between the first and second fixed lens groups.

An autofocus zoom miniature MEMS camera module is provided that includes a housing with an aperture for capturing digital images, an image sensor and an optical assembly. The optical assembly is provided with at least one fixed lens group and at least one movable lens group. A MEMS actuator is configured to move the movable lens group along an optical axis of the camera module relative to the image sensor and the fixed lens group to automatically focus an object at a determined zoom disposed an arbitrary distance from the camera module onto the image sensor.

The movable lens group may include one or more movable lenses disposed nearest an object end of the optical path that are movable along the optical axis of the camera. The fixed lens group may include one or more fixed lenses disposed between the movable lens group and the image sensor that are fixed in position relative to the image sensor, housing or a substrate to which the image sensor is coupled, or combinations thereof.

The image sensor may be disposed approximately at a back focal length of the one or more fixed lenses. The one or more fixed lenses may be configured to compensate for a field curvature induced by the one or more moving lenses. The one or more fixed lenses may be configured to match an associated point spread function to a pixel dimension of the image sensor approximately uniformly over an area of the image sensor. The one or more fixed and movable lenses may be configured such that an autofocus distance range comprises 10 cm to 9 m. The one or more fixed and movable lenses may be configured such that an autofocus distance range comprises 15 cm to 5 m. The one or more fixed and movable lenses may be configured such that an autofocus distance range comprises 20 cm to 3 m. The autofocus distance may exclude a hyperfocal distance.

An optical assembly for an autofocus zoom miniature MEMS camera module is also provided that includes a housing defining an aperture, one or more lenses that are fixed relative to the housing, a MEMS actuator, and one or more movable optical elements coupled to the MEMS actuator. An object disposed an arbitrary distance from a camera module that includes the optical assembly is automatically focused at a determined zoom onto the image sensor by MEMS actuation of the one or more movable optical elements.

The optical assembly and/or MEMS camera module may include a zoom feature ranging between ×0.5 and ×5, or between ×1 and ×3.

The optical assembly may include a movable lens housing containing the one or more movable lenses.

An optical axis of the one or more movable optical elements may be displaced from an optical axis of the camera module by not more than approximately 0.5 mm, or by not more than approximately 0.2 mm, or by not more than approximately 0.1 mm.

The movable and fixed lens groups may be relatively disposed with a centering alignment within 90 microns, or in a range between 40 microns and 140 microns.

A third lens group may be fixed relative to the housing. The movable lens group may be disposed between the first and third fixed lens groups.

The focus travel length of the second lens group may be more than 50, 100, 200, or 300 microns, and/or within a range between 100 microns and 300 microns or within a range between 50 microns and 500 microns.

Another autofocus zoom miniature MEMS camera module is provided that includes a housing, a MEMS actuator, one or more movable optical elements coupled to the MEMS actuator, an image sensor, a processor, and a storage medium having code embedded therein for programming the processor to perform an autofocus zoom method. An object disposed an arbitrary distance from the camera module is automatically focused at a determined zoom onto the image sensor by MEMS actuation of the one or more movable optical elements.

The code may be configured to program the processor to correct for distortion or another artifact produced in a predictable manner by one or more optical elements of the camera. The code may be configured to program the processor to process information from image sensor pixels irrespective of a number of pixels within an image area that are illuminated by the one or more optical elements.

The code may be implemented in hardware or software or both.

The processor may be configured to perform an autofocus zoom method within an image processing pipeline on the image sensor.

The processor may be configured to perform the autofocus zoom method on a discrete platform. The discrete platform may include an image processor or image signal processor. The discrete platform may include a baseband chip in a mobile phone. A machine readable file that has largely constant size and effective image resolution irrespective of autofocus zoom setting.

The camera may be configured with a zoom feature ranging between ×0.5 and ×5, or between ×1 and ×4, or between ×1 and ×3.

A movable lens housing may contain the one or more movable lenses. The movable lens housing may be configured to be movable mechanically along the optical axis of the camera. The MEMS actuator or another actuator may be configured to move the movable lens housing along the optical axis. The movable lens housing may include one or more guide pins and one or more sleeves configured such that the guide pins are fixed in position while the sleeves move along the guide pins.

The guide pins may be mechanically referenced to the image sensor and the sleeves may be joined to the movable lens housing. The guide pins may include two or more guide pins, or three or more guide pins, or five or more guide pins. The guide pins may include a circular cross section. The one or more sleeves may include a shape, when viewed in section, that forms one or more area contacts to the guide pins. The shape of the one or more sleeves may include an oval shape, a "V" shape, a triangular shape, a square shape, a pentagon shape, a hexagon shape, and/or another polygon shape, e.g., a regular polygon, or an irregular polygon, or the one or more sleeves may have a circular shape.

The one or more sleeves may be configured to be forced into contact with the one or more guide pins by a lateral force. The lateral force may include approximately 0.5 grams. A spring may be used to provide the lateral force. A magnet may be used to provide the lateral force.

A movable housing may include one or more guide pins and one or more flexible components that are flexible in a direction along the optical axis. The guide pins may be fixed in position while the flexible components move along the guide pins. The one or more flexible components may include leaf springs that are fixedly attached to the guide pins and the movable lens housing. The one or more flexible components may include one or more opposing pairs having a spring rate that is approximately constant through a flexure range.

The camera module housing and image sensor may define an optical axis of the MEMS camera module. An axis of the one or more movable optical elements may be displaced from the optical axis of the MEMS camera module by not more than approximately 0.5 mm, or by not more than approximately 0.2 mm, or by not more than approximately 0.1 mm.

The MEMS actuator may be configured to move the one or more movable lenses within a range between 50 and 500 microns, or within a 350 micron range, or within a 200 micron range.

A method of assembly of a miniature MEMS camera module is provided. The method includes abutting registration features of an optical assembly that includes both a fixed lens group and a movable lens group including one or more movable lenses, and affixing the movable lens group in location within a movable lens housing. A MEMS actuator is coupled to the movable lens group or housing or both, whereby in use the MEMS actuator is configured to move the movable lens group relative to the fixed lens group to automatically adjust a focus distance of the optical assembly.

The affixing may involve applying an adhesive. The applying an adhesive may include joining the movable lens housing to a sleeve that is configured to couple with a pin that is fixed to the miniature camera module.

The method may include coupling the optical assembly with an image sensor component, which may involve fixing the fixed lens group relative to an image sensor portion of the image sensor component while the movable lens group or movable lens housing or both is configured to be movable relative to the image sensor portion by actuation of the MEMS actuator to adjust said focus distance of the optical assembly. The method may further include coupling the image sensor component to a printed circuit.

The miniature MEMS camera module, upon assembly, may defines an optical axis that is displaced from an axis of the movable lens group not more than approximately 0.5 mm, or not more than approximately 0.2 mm, or not more than approximately 0.1 mm.

A miniature MEMS autofocus camera module is also provided that includes a housing, an image sensor coupled to the housing, an autofocus optical module coupled within the housing and including a MEMS actuator that is configured to move one or more movable lenses relative to one or more fixed lenses along an optical axis of the camera module to adjust a focusing distance of the autofocus optical module to automatically focus an object disposed an arbitrary distance from the camera module onto the image sensor. This miniature MEMS autofocus optical module includes one or more pairs of adjacent lens surfaces that include abutting registration features to aid in alignment. An optical assembly for the aforementioned miniature MEMS autofocus camera module is also provided.

The one or more movable lenses may be disposed nearest an object end of the optical path between a housing aperture and the image sensor. The one or more fixed lenses may include at least a first fixed lens disposed between the one or more movable lenses and the image sensor. The image sensor may be disposed approximately at a back focal length of the first fixed lens.

The one or more fixed lenses may include at least a second fixed lens disposed between the object end and the one or more movable lenses, such that the one or more movable lenses are disposed between the first and second fixed lenses. The second fixed lens may be configured in accordance with a processor-implemented zoom component to apply zoom to captured image data.

The miniature MEMS camera module, upon assembly, may define an optical axis that is displaced from an axis of the movable lens group not more than approximately 0.5 mm, or not more than approximately 0.2 mm, or not more than approximately 0.1 mm. The one or more fixed lenses may include first and second fixed lens groups each comprising one or more lenses that are fixed relative to the image sensor. The one or more movable lenses may be disposed between the first and second fixed lens groups.

A miniature MEMS autofocus camera module is also provided that includes an image sensor and an optical assembly including a movable lens group that includes one or more lenses and that is coupled to a MEMS actuator such that the movable lens group is movable relative to the image sensor. The optical assembly also includes at least a first fixed lens group that comprises one or more lenses and that is fixed relative to the image sensor. A processor is programmed to control an autofocus method designed to adjust a focus distance to an object disposed an arbitrary distance from the miniature MEMS autofocus camera module by actuating the MEMS actuator that is coupled with the movable lens group.

The optical assembly may include a second fixed lens group that includes one or more lenses that are fixed relative to the image sensor. The movable lens group may be disposed between the first and second fixed lens groups.

A first surface of the one or more fixed lenses furthest from the image sensor and a second surface of the one or more movable lenses nearest to the image sensor may be provided with one or more physical registration features configured to abut to aid alignment during assembly.

A spacer may be disposed between the first and second surfaces. The spacer may have been inserted for operation after assembly. The absence of the spacer during assembly may have permitted the registration features of the first and second surfaces to abut. The spacer may be configured to achieve a separation in a range between 50 and 500 microns, or in a range between 50 and 150 microns, or in a range between 200 and 300 microns, or the spacer may be configured to achieve a separation of approximately 100 microns, or approximately 250 microns.

The optical assembly may include one or more pairs of adjacent lens surfaces that include abutting registration features.

The miniature MEMS camera module, upon assembly, may define an optical axis that is displaced from an axis of the movable lens group not more than approximately 0.5 mm, or not more than approximately 0.2 mm, or not more than approximately 0.1 mm.

In operation of the autofocus zoom module, a registration of de-center between the one or more fixed lenses and the one or more moving lenses may be approximately seven microns or less, or approximately five microns or less, or approximately three microns or less.

In operation of the autofocus zoom module, a registration of tilt between the one or more fixed lenses and the one or more moving lenses may be approximately 0.3 microns or less, or approximately 0.2 microns or less, or approximately 0.1 microns or less.

An optical assembly for a miniature MEMS camera module may include an optical assembly housing, configured for coupling with an image sensor component, and an autofocus optical module coupled within the housing. The autofocus optical module includes a MEMS actuator that is configured to move one or more movable lenses relative to one or more fixed lenses along an optical axis to adjust a focusing distance of the autofocus optical module.

The one or more movable lenses may be disposed nearest an object end of the optical path and may be movable along the optical axis. The one or more fixed lenses may be disposed nearest an image end of the optical path and may be fixed in position relative to the housing. The optical assembly housing may be configured to couple with an image sensor portion of the image sensor component that is disposed approximately at a back focal length of the one or more fixed lenses.

The one or more fixed lenses may include first and second fixed lens groups each having one or more lenses that are fixed relative to the housing. The one or more movable lenses may be disposed between the first and second fixed lens groups. The optical assembly may include one or more pairs of adjacent lens surfaces that include abutting registration features. The optical assembly, upon assembly with an image sensor component, may define an optical axis that is displaced from an axis of the movable lens group not more than approximately 0.5 mm, or not more than approximately 0.2 mm, or not more than approximately 0.1 mm.

The optical assembly and an image sensor component may be coupled to form an autofocus camera module, whereby a registration of de-center between the one or more fixed lenses and the one or more moving lenses comprises approximately seven microns or less, or approximately five microns or less, or approximately three microns or less.

A registration of tilt between the one or more fixed lenses and the one or more moving lenses of the optical assembly may comprise approximately 0.3 microns or less, or approximately 0.2 microns or less, or approximately 0.1 microns or less.

A further miniature MEMS autofocus camera module is provided that includes an image sensor and an optical assembly including a movable lens group that includes one or more lenses and that is coupled to a MEMS actuator such that the movable lens group is movable relative to the image sensor. The optical assembly further includes at least a first fixed lens group that includes one or more lenses and that is fixed relative to the image sensor. In operation of the miniature MEMS autofocus camera module, a registration of de-center between the one or more fixed lenses and the one or more moving lenses comprises approximately seven microns or less.

A first surface of a first fixed lens of the first fixed lens group and a second surface of a first movable lens of the movable lens group may be provided with one or more physical registration features configured to abut to aid alignment.

A first surface of the one or more fixed lenses furthest from the image sensor and a second surface of the one or more movable lenses nearest to the image sensor may be provided with one or more physical registration features configured to abut to aid alignment.

In operation of the autofocus zoom module, a registration of de-center between the one or more fixed lenses and the one or more moving lenses may comprise approximately five microns or less, or approximately three microns or less.

In operation of the autofocus zoom module, a registration of tilt between the one or more fixed lenses and the one or more moving lenses comprises approximately 0.3 microns or less, or approximately 0.2 microns or less, or approximately 0.1 microns or less.

A spacer may be disposed between the first and second surfaces. The spacer may have been inserted for operation after assembly. The absence of the spacer during assembly may have permitted the registration features of the first and second surfaces to abut. The spacer may be configured to achieve a separation in a range between 50 and 500 microns, or in a range between 50 and 150 microns, or in a range between 200 and 300 microns, or the spacer may be configured to achieve a separation of approximately 100 microns, or approximately 250 microns.

Another miniature MEMS-actuated camera module is provided that includes one or both of a camera module housing or a rigid substrate that either defines an aperture or is coupled to an aperture, or both. An image sensor is coupled to the one or both of the camera module housing or rigid substrate. A first lens group is coupled to the housing and fixed relative to the image sensor or coupled directly to the image sensor or both. A MEMS actuator is coupled to the housing or rigid substrate. A second lens group is coupled to the actuator and is movable relative to the image sensor.

An optical assembly for the miniature MEMS camera module may include a housing that either defines an aperture or is coupled to an aperture, or both, and that is configured to couple with an image sensor component for focusing images with said optical assembly onto an image sensor portion of said image sensor component when said housing is coupled to said image sensor component, a first lens group coupled to and fixed relative to the housing, a MEMS actuator coupled to the housing, and a second lens group coupled to and movable with the MEMS actuator relative to the first lens group.

A rigid substrate may be coupled to the camera module housing.

A lens barrel may contain at least the second lens group.

The MEMS actuator may be coupled to one, two, three, four or more lenses of the second lens group for moving the one, two, three, four or more lenses along the optical path relative to the image sensor.

The second lens group may include four lenses. The first lens group may include a single lens.

The second lens group may include a single movable lens. The first lens group may include two fixed lenses. A third lens group may include one or two more fixed lenses. The second lens group may be disposed and movable through an autofocus range between the first and third fixed lens groups.

The first and second lens groups may be relatively disposed with a centering alignment within 1 micron, or within 3 microns, or within 5 microns, or within 10 microns.

The first and second lens groups may be relatively disposed with a tilt alignment within of 0.01°, or within 0.05°, or within 0.1°, or within 0.2°, or within 0.3°, or within 0.4°.

The first and second lens groups may be relatively disposed within a centering alignment in a range between of 1 micron and 10 microns, or in a range between 2 microns and 5 microns.

The first and second lens groups may be relatively disposed within a tilt alignment in a range between 0.05° and 0.3°, or in a range between 0.1° and 0.2°.

The focus travel length of the second lens group may be more than 50 microns, or more than 100 microns, or more than 150 microns, or more than 200 microns, or more than 250 microns, or more than 300 microns, or within a range between 100 microns and 300 microns, or within a range between 50 microns and 500 microns.

The first lens may be disposed a distance from the sensor along the optical path within a range between around its back focal length ±10 microns. The back focal length may include between 700 and 1100 microns, or between 500 and 1300 microns, or approximately 900 microns.

The second lens group and image sensor may be relatively disposed with a centering alignment within 90 microns, or in a range between 40 microns and 140 microns.

A third lens group may be coupled to the housing and fixed relative to the image sensor. The second lens group which is movable relative to the image sensor may be disposed between the first and third lens groups which are each fixed relative to the image sensor.

A further variation of a variable optic camera is a camera wherein the optical train is divided into groups, some of which are fixed in functionality and position and others of which are variable in functionality and position. By this means, more advanced control of the optical train can be accomplished. For example, by moving two particular groups of lenses along the optical axis, the field of view of the camera can be altered. Because the resolution of a camera is generally fixed by certain other parameters, restricting the field of view results in effective magnification of objects in the scene. Consequently, cameras of this type are referred to as 'zoom'.

Several embodiments are described of advantageous auto focus zoom cameras and camera modules, and/or components or subsets of features of auto focus zoom cameras. In one embodiment, auto focus and zoom functionality is accomplished through a combination of one lens of special design that is fixed in position, a single lens that can be moved along the optical axis of the camera and an algorithm that makes changes to the electronic form of the image. Related embodiments and alternative features relating especially to the zoom feature of this embodiment may be described at US reissue patent RE42,898 and at US published patent applications nos. US2009/0115885 and US2009/0225171 and are incorporated by reference. In another embodiment, zoom functionality is provided by one or more additional moving lenses. The single lens that can be moved in the electronic zoom embodiment may be one that is sited in the middle of the optical train and that is movable to provide auto focus functionality. More than a single lens may be movable in other embodiments, and more than one fixed lens are included in other embodiments.

Certain other optical components are included in various combinations in different embodiments, such as one or more stops, apertures and/or an infrared filter that are not always specifically mentioned with each embodiment. The infrared filter may be included between the image sensor and the last lens of the optical train, or elsewhere along the optical path. One or more apertures may be fixed at a surface of lens or independently fixed to the camera module housing or to a lens barrel housing or other fixed component of the camera module or camera device. One or more apertures may move, such as a movable aperture on or with the movable lens. In certain embodiments, an aperture for the movable lens is movable as being on or near the surface of the movable lens or otherwise fixed relative to the movable lens so that the aperture and movable are movable together using the actuator. In other embodiments the aperture for the movable lens can be fixed relative to the image sensor.

The special lens of the electronic zoom embodiment accomplishes zoom by matching the so-called point spread function (PSF) of the optical train to the image sensor. PSF is a quantity that describes the extent to which a theoretical point of light of zero area would expand as it passes through the optical train of the camera. The expansion occurs due to defects in the materials used for the lenses, surface imperfections, alignment tolerances and a host of other factors. The lower the quality of the optical train, the larger the PSF will be. A good match between the optical train and image sensor occurs when the PSF matches the dimensions of the pixels in the image sensor. If the optical train is over-specified, the point of light will spread only slightly and remain smaller than one pixel. Conversely, if the optical train is under-specified, the point of light will spread excessively to cover several pixels resulting in a blurred image.

The PSF of the optical train may vary with the radius, e.g., being smaller at the centre than in the middle. This means that there may be a mismatch between the PSF and pixel size across the lens radius. Ideally the pixels in the centre would be smaller than those at the periphery to match the variation in PSF function across the lens radius; this is how the eyes of birds of prey are configured. Unfortunately manufacture of image sensors with a non-uniform distribution of pixels is not widely available at the moment because they are not (yet) economically viable. One solution is to set the PSF to match the pixel size at about two thirds of the lens radius. This produces an image that is sharp in the centre and slightly blurred at the edges, but is probably acceptable in certain embodiments since the objects of greatest interest in the scene are usually in the centre of the image.

It is possible to include in an optical train a special lens so that at the periphery the PSF matches the pixel size of the imager. If this optic design were continued inwards it would result in the lens being over-specified since the PSF decreases towards the optical axis. This problem is overcome in certain embodiments by increasing the magnification of the optical system towards the centre. Magnification will increase the effective size of the point of light and hence the effective PSF. The magnification may be set in certain embodiments to be sufficient so that the PSF matches the pixel size over the entire area of the imager. The result is that the lens has higher magnification in the centre than at the periphery.

An electronic camera incorporating a special lens of the type described is able to provide for dynamic alteration of the field of view, in other words zoom, by imaging cropping. While cropping usually decreases image quality since information from the scene is discarded, the fidelity of the cropped image is preserved in certain embodiments because the centre of the image has been magnified by the special lens. The special optic used in certain embodiments to produce a dynamic field of view camera will produce distortion of the image that resembles barrel distortion. The extent of the distortion is fixed and controlled by the lens design. This makes it relatively efficient to correct and remove distortion and other predictable artefacts by configuring the image data in an image processing operation performed by an on-board processor, or other processor, programmed by a certain algorithm designed for the specific purpose. A camera with zoom based on this principal of operation may be described in US patent RE42,898, US published patent applications nos. 2012/0063761, 2011/0221936, 2011/0216158, 2009/0115885 and 2009/0225171, and/or U.S. patent application Ser. No. 61/609,293 and Ser. No. 13/445,857, which are all incorporated by reference. The algorithm may be stored on the camera module or outside the camera module within an electronic device within which the camera module is a component, or on the cloud or otherwise as long as it is accessible by a processor of the camera module or device or external component that is configured to apply the algorithm to image data, e.g., raw data from the image sensor or pre-processed image data, that is not yet stored, transmitted or displayed as permanent image data until the processor applies the algorithm to the data so that the image may be displayed with the appearance of zoom magnification.

The special fixed lens involved in producing zoom in combination with an algorithm is, for reasons of physics in certain embodiments, the lens closest to the image sensor. Alternative approaches to add auto focus may involve moving one or more other lenses in the optical train as a group. An auto focus zoom camera based on this principal of operation is described in U.S. Patent application Ser. No. 61/609,293. This movable lens group may contain more than one movable lens, and may contain four lenses as described in the '293 application, as well as various numbers of stops and apertures depending on the particular number and geometry of the lens or lenses forming the movable lens group. The embodiments wherein only a single lens is included in the movable lens group, such as the middle lens L3 being movable relative to two pairs of fixed lenses L1-L2 and L4,-L5 located on either side of the middle lens L3, have an advantage of smaller mass and thus a relatively lower force is involved in moving it, and even has a surprising further advantage that a smaller displacement range actuator may be used.

Another feature of an auto focus zoom camera module in accordance with certain embodiments involves the realisation of auto focus in combination with zoom from a special lens of the type described above, by moving the middle lens in the optical train in certain embodiments, e.g., L3 in an optical train including five lenses or L5 in an optical train of seven lenses. In other embodiments, the movable lens is offset from the middle somewhere between at least one fixed lens and the rest of the optical train, e.g., L2 or L4 in the five lens embodiment or L2, L3, L5 or L6 in the seven lens embodiment. Still other embodiments involve movable lenses at one or both ends of the optical train.

A schematic representation of an example of an optical train configured with a movable middle lens is given in FIG. 1. Contrary to perceived expectation, it transpires that to achieve a similar focus range to a conventional auto focus camera, the middle lens is moved a relatively short distance, typically around 100 μm. This makes possible the use of novel forms of actuator, such as MEMS, to move the lens and a number of consequential benefits arising from the inherent characteristics of such devices. Of the many benefits of this design, small size, low power consumption, low noise, high speed and high accuracy of movement and other improvements are provided.

By way of non-limiting and non-exhaustive examples, certain embodiments will now be described in detail with reference to FIGS. 1-6.

Reference is made to FIG. 1, which is a schematic representation of an auto focus zoom camera in accordance with certain embodiments. The camera comprises the two general components mentioned above, namely an optical train 101 and an image sensor 102. Only the lenses of the optical train are shown in the interests of clarity. In various embodiments, the optical train may include a number of other elements, including stops, apertures and an infrared filter particularly when a silicon-based image sensor is being used. The optical train in the example illustrated at FIG. 1 includes five lenses. Traditionally the lens nearest the scene 103 is designated L1 and progressing L2, L3 etc. in a direction towards the image sensor. The lenses are desirably aligned in tilt, centering and rotation to the optical axis 104 of the camera. The fixed lenses can be considered to be in two fixed groups. The upper fixed group 105, comprising L1 and L2, is nearest the scene, while the lower fixed group 106 comprising L4 and L5, is nearest the image sensor. Lens L5 is the special lens that provides the described zoom function in combination with the algorithm. Lens L3 is the middle lens in the optical train. As indicated by the bi-directional arrow, this lens has a range of travel along the optical axis of the camera for adjusting focus.

Figure 2:
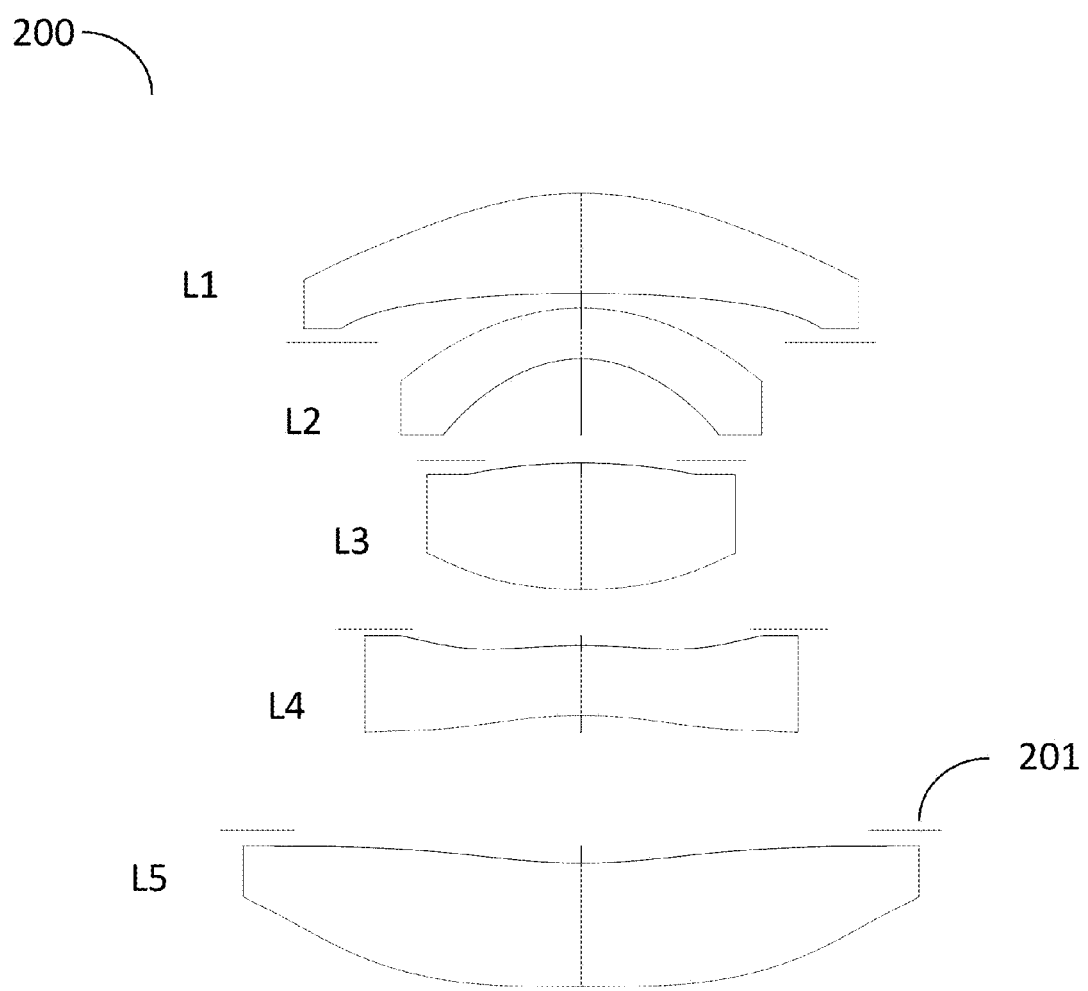
FIG. 2 schematically illustrates an optical train of a MEMS auto focus miniature camera module in accordance with certain embodiments.

FIG. 2 shows one possible embodiment of lens profiles suitable for the optical train of the MEMS autofocus miniature camera module of FIG. 1. As shown, L1 and L2 are predominantly meniscus lenses facing the scene in the example of FIG. 2. Lens L3 is generally bi-convex, but may have variable curvature along its radius. L4 may have a complex profile including different directions or degrees of curvature at different points along its radius, and is superficially bi-concave in the example illustrated at FIG. 2. L5 may be referred to as a complex meniscus lens facing the image sensor or a fish eye lens in certain embodiments or may be the same as or similar to a lens or lenses described in USRE42,898 and/or US2009/0115885 and/or US2009/0225171. By complex meniscus, it is meant that the two surfaces are at least generally curved in the same direction, convex or concave, but do not have to have the same direction of curvature all along the radius of the lens surface and/or may have different degrees of curvature at different radii. For example, the lens L5, illustrated by example in FIG. 2, includes a back surface that has a small area in the middle that is concave, while the rest of the back surface of L5 has a convex curvature and the front surface is concave, resulting in what may be referred to as complex meniscus.

The lens diameters decrease from L1 to L3, then increase from L3 to L5 in the example illustrated at FIG. 2. In general, the movable lens, e.g., L3 in this example, may have a smaller diameter than the fixed lenses of the optical train to accommodate the micro-electro-mechanical system, or MEMS, actuator component that is coupled with the movable lens, while the fixed lenses may have same or similar diameters relative to each other. Also indicated in FIG. 2 by horizontal lanes on lens surfaces 201 are the positions of optical stops in accordance with certain embodiments. Lenses L3, L4 and L5 have optical stops on the scene side on the lens, while L1 has a stop on the image side of the lens. The stop on L3 may move in tandem with the lens.

Consideration of the optical design reveals that to achieve a wide range of focus from very close to the camera to very removed, L3 will have a stroke of about 100 μm or more. L3 may be spaced from L2 by a gap of about 190 μm when the actuator is at rest, while the actuator is configured according to its motion, in certain embodiments, so that the gap decreases when the focus is altered.

In certain embodiments L3 is moved by a MEMS actuator. Suitable MEMS actuators are described in several of the US Patents and US patent applications incorporated by reference herein below. Another MEMS actuator having a somewhat different design is described in US-PCT application no. PCT/US2012/024018. Such actuators can be fabricated in silicon or substantially polymeric materials and have a stroke of around 100 μm. They also exhibit a number of other beneficial characteristics, which are conferred on a MEMS auto focus miniature camera module or on a MEMS auto focus zoom miniature camera module of the type described. These include, very low power consumption, small optical path distance and small Z dimension thickness, fast and precise actuation, low noise, negligible particulate contamination and low cost.

A MEMS actuator in accordance with certain embodiments may be thought of as generally a unidirectional device, setting aside for the moment any centering or tilt alignment movements that may be ascribed to an actuator component. That is, a MEMS actuator in accordance with certain embodiments has a rest position and the actuator can be driven from that rest position in one dimension only. This has a benefit for the assembly of auto focus camera modules in that it permits the entire lens train, or a substantial portion thereof, to be assembled as a pre-aligned unitary component. For subsequent assembly and calibration steps, it can then be handled similarly to or in exactly the same manner as the lens train of a fixed focus camera, namely the focus can be set by inserting a holder, containing the lens train into a sleeve fixed over the image sensor. In certain embodiments, the holder and sleeve are coupled by a screw thread.

Figure 3:
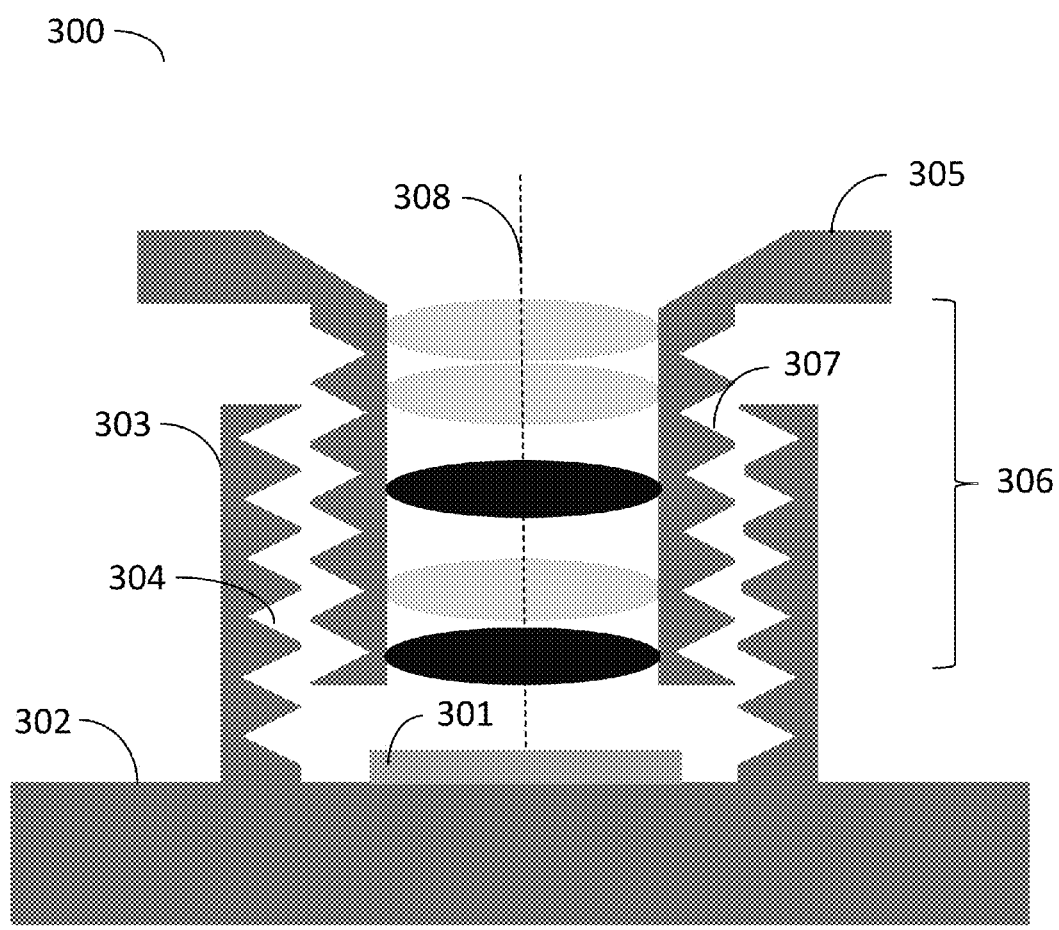
FIG. 3 schematically illustrates a cross sectional view through a MEMS auto focus miniature camera in accordance with certain embodiments, where the optical train has been fabricated as a pre-aligned unitary component in accordance with certain embodiments.

FIG. 3 schematically illustrates a cross-section through a MEMS auto focus zoom miniature camera module or MEMS autofocus miniature camera module in accordance with certain embodiments that utilizes assembly with the lens train fabricated as a pre-aligned unitary component. The image sensor 301 in this embodiment resides on a substrate 302 to which is attached a sleeve 303. The sleeve has a screw thread 304. The holder 305 containing the lens train 306 has a mating screw thread 307. Rotating the holder with respect to the sleeve moves the entire lens train, in this example embodiment, along the optical axis 308 of the camera, permitting the focus to be set.

Figure 4:
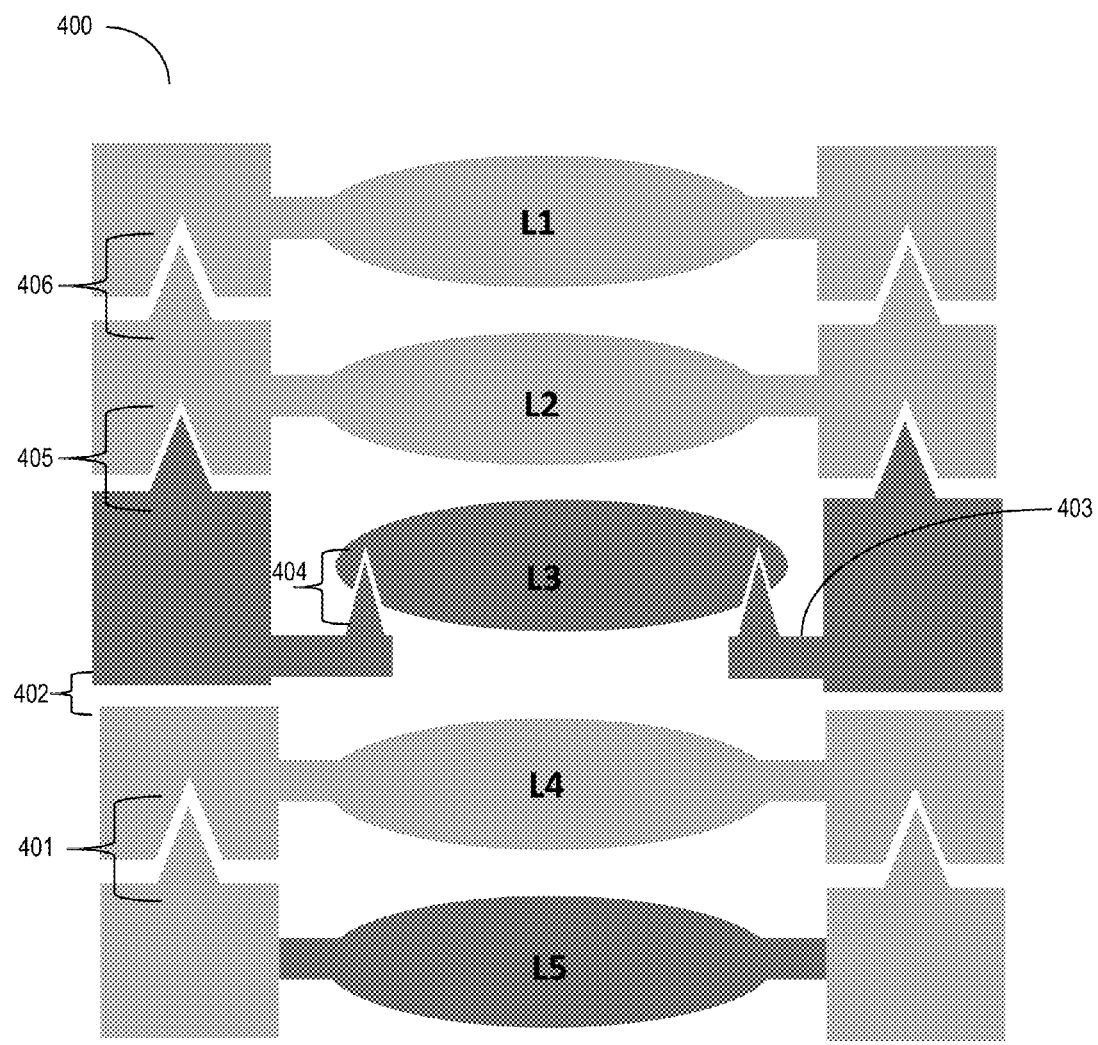
FIG. 4 schematically illustrates a cross-sectional view through the optical train of a MEM auto focus miniature camera module in accordance with certain embodiments, particularly illustrating one or more lenses that are passively aligned and one or more lenses that are actively aligned.

For an optic train to transmit images at high fidelity involves alignment of the various elements of the train, principally the lenses, with respect to tilt, centering and rotation with respect to one another to a certain degree of accuracy. While it is possible to achieve very exact alignment of one lens to another using active alignment techniques in certain embodiments, passive methods are used in several embodiments, and typically wherever possible, due to the high speed of assembly and low cost of this approach. In a MEMS auto focus miniature camera module in accordance with certain embodiments, passive alignment tolerances are accommodated in all but one of the joints of the lens train. This is the example arrangement that is illustrated in FIG. 4. The passive alignment features are indicated by cups and cones, in the interests of clarity, although possible sizes and geometries of passive alignment features are multitudinous. The passive alignment features include physical features that mate in such a manner so as to eliminate one or more degrees of freedom, and may perhaps eliminate all of them, or at least as many degrees of misalignment as possible. Passive alignment in accordance with certain embodiments achieves alignment in all axes better than +/−5 μm, and in some embodiments substantially smaller. Starting from the image sensor upwards, L4 is aligned to L5 by a passive alignment feature 401. Active alignment 402 is used between the MEMS actuator and L4. This permits L3 to be aligned to the MEMS actuator 403 by passive alignment 404. L2 is aligned to the MEMS actuator, and thereby L3 by passive alignment 405. L1 is also aligned to L2 by passive alignment 406. A passive alignment technique that is used in certain embodiments may be referred to as 'lens stacking'.

Figure 5:
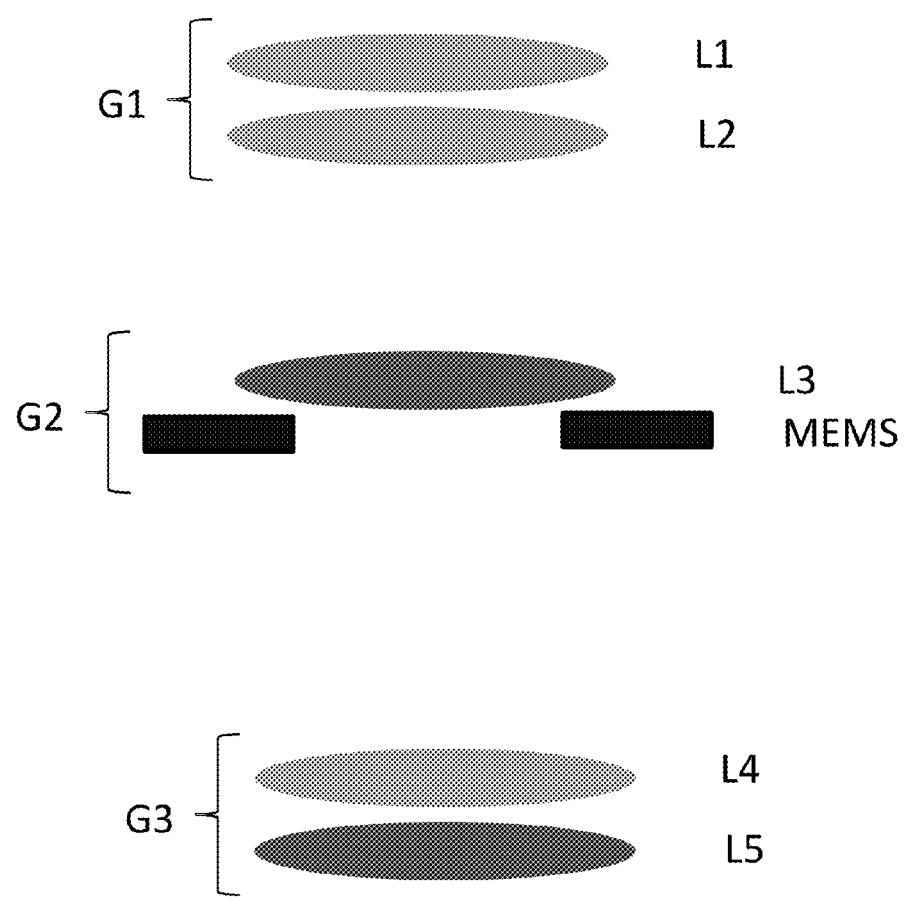
FIG. 5 and FIG. 6 show examples of possible sequences of steps to fabricate an optical train of a MEMS auto focus miniature camera module in accordance with certain embodiments.
Figure 6:
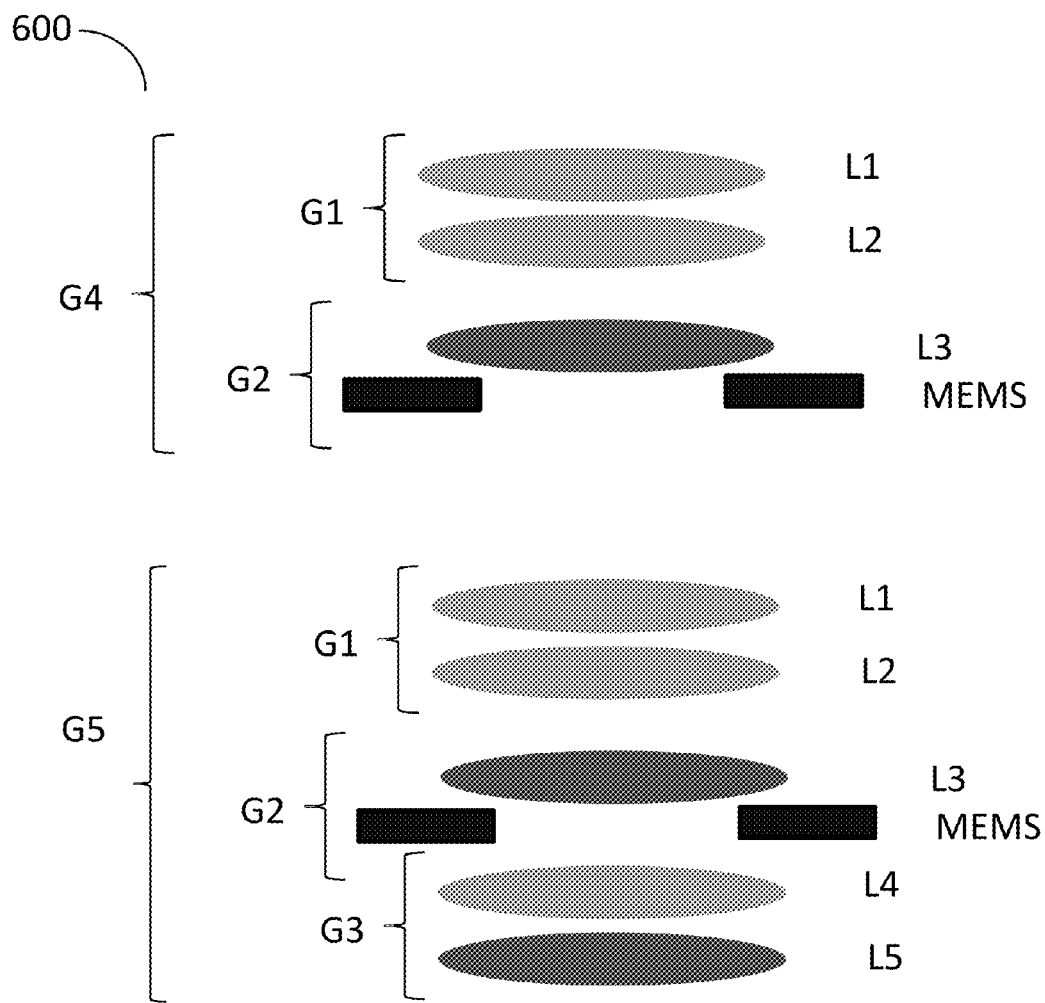

A method of assembling the optical train in accordance with certain embodiments is as follows (see FIG. 5 and FIG. 6). In one example, L1 is joined to L2 to form a first sub-assembly G1. L3 is joined to the MEMS actuator to form a second sub-assembly G2. L4 is joined to L5 to form a third sub-assembly G3. These lens assembly operations include the stops associated with each lens. G1 is then assembled on G2 to form sub-assembly G4. Finally, G4 is assembled on G3. In certain embodiments, active alignment is used to align G3 and G4 to form G5. Active alignment may include fixing two groups such as G3 and G4 in position, e.g., using UV cured adhesive or clamp or other fastening component or technique, once alignment has been achieved.

When the optical train is complete, it is desirable in certain embodiments to add one additional component, namely an infrared cut filter between the lower lens L5 and the image sensor. In a typical design the distance between L5 and the infrared cut filter will be about 250 μm. This is possible because an infrared cut filter will typically be around 100-300 μm in thickness and the distance between L5 and the image sensor may be approximately 900 μm in an example embodiment. Other designs, such as those described at U.S. Ser. No. 13/445,857, which is incorporated by reference, may be advantageously included, in whole or in part in an advantageous MEMS auto focus miniature camera module or MEMS auto focus zoom miniature camera module.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein are incorporated by reference, as well as the background, abstract and brief description of the drawings, and U.S. applications 61/657,012, 61/675,812, 61/622,480, Ser. Nos. 13/541,650, 13/767,877, 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, 13/445,857, 13/571,405 and PCT application WO2007/110097, and U.S. Pat. No. 6,873,358, and RE42,898 are each incorporated by reference into the detailed description of the embodiments as disclosing alternative embodiments.

Components of MEMS actuators that may be included with a camera module that includes a movable optic or optical group in accordance with alternative embodiments are described at U.S. Pat. Nos. 7,972,070, 8,014,662, 8,090,252, 8,004,780, 7,747,155, 7,990,628, 7,660,056, 7,869,701, 7,844,172, 7,832,948, 7,729,601, 7,787,198, 7,515,362, 7,697,831, 7,663,817, 7,769,284, 7,545,591, 7,792,421, 7,693,408, 7,697,834, 7,359,131, 7,785,023, 7,702,226, 7,769,281, 7,697,829, 7,560,679, 7,565,070, 7,570,882, 7,838,322, 7,359,130, 7,345,827, 7,813,634, 7,555,210, 7,646,969, 7,403,344, 7,495,852, 7,729,603, 7,477,400, 7,583,006, 7,477,842, 7,663,289, 7,266,272, 7,113,688, 7,640,803, 6,934,087, 6,850,675, 6,661,962, 6,738,177, and 6,516,109; and at US published patent applications nos. 2010/030843, 2007/0052132, 2011/0317013, 2011/0255182, 2011/0274423, and at U.S. patent applications Ser. Nos. 13/302,310, 13/247,938, 13/247,925, 13/247,919, 13/247,906, 13/247,902, 13/247,898, 13/247,895, 13/247,888, 13/247,869, 13/247,847, 13/079,681, 13/008,254, 12/946,680, 12/946,670, 12/946,657, 12/946,646, 12/946,624, 12/946,614, 12/946,557, 12/946,543, 12/946,526, 12/946,515, 12/946,495, 12/946,466, 12/946,430, 12/946,396, 12/873,962, 12/848,804, 12/646,722, 12/273,851, 12/273,785, 11/735,803, 11/734,700, 11/848,996, 11/491,742, and at USPTO-Patent Cooperation Treaty applications nos. PCT/US12/24018, PCT/US11/59446, PCT/US11/59437, PCT/US11/59435, PCT/US11/59427, PCT/US11/59420, PCT/US11/59415, PCT/US11/59414, PCT/US11/59403, PCT/US11/59387, PCT/US11/59385, PCT/US10/36749, PCT/US07/84343, and PCT/US07/84301.

The following are also incorporated by reference as disclosing alternative embodiments:

U.S. Pat. Nos. 8,363,952, 8,358,841, 8,417,055, 8,422,739, 8,285,001, 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, 7,317,815, and 7,289,278; and United States published patent applications serial nos. 2012/0019614, 2012/0019613, 2012/0008002, 2011/0216156, 2011/0205381, 2012/0007942, 2011/0141227, 2011/0002506, 2011/0102553, 2010/0329582, 2011/0007174, 2010/0321537, 2011/0141226, 2010/0141787, 2011/0081052, 2010/0066822, 2010/0026831; 2009/0303343, 2009/0238419, 2010/0272363, 2009/0189998, 2009/0189997, 2009/0190803, 2009/0179999, 2009/0167893, 2009/0179998, 2008/0309769, 2008/0266419, 2008/0220750, 2008/0219517, 2009/0196466, 2009/0123063, 2008/0112599, 2009/0080713, 2009/0080797, 2009/0080796, 2008/0219581, 2009/0115915, 2008/0309770, 2007/0296833, 2007/0269108; and U.S. patent applications Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701, and 12/944,662.

What is claimed is:

1. An auto focus zoom camera module, comprising:
a camera module housing;
an image sensor within the housing;
an optical train within the housing including multiple lenses configured to provide auto focus and zoom for the camera module, including a first fixed lens group, a second fixed lens group and a movable lens that is disposed between the first and second fixed lens groups and that is coupled to an actuator to move the movable lens relative to the image sensor and the first and second fixed lens groups in an auto focus zoom operation of the camera module, wherein the actuator is disposed within the housing and fixedly aligned to the first fixed lens group and the second fixed lens group, wherein the first fixed lens group comprises a lens L1 and a lens L2, the movable lens comprises a lens L3, and the second fixed lens group comprises a lens L4 and a lens L5, the optical train further comprising:
a first optical stop provided on an image side of the lens L1;
second optical stops provided on a scene side of each of lenses L3, L4, and L5, wherein the second optical stop provided on the lens L3 is configured to move in tandem with the lens L3.

2. The camera module of claim 1, wherein the first fixed lens group comprises at least two fixed lenses.

3. The camera module of claim 2, wherein the second fixed lens group comprises at least two fixed lenses.

4. The camera module of claim 3, wherein the movable lens is disposed in the middle between two pairs of fixed lenses and the actuator is formed with a silicon material.

5. An auto focus camera enabled embedded device, comprising:
an embedded device housing;
a processor within the housing;
a camera module within the embedded device housing, wherein the camera module includes an image sensor; and
an optical train at least including a first fixed lens group nearest the image sensor and a second fixed lens group, and at least one movable lens disposed between the first and second fixed lens groups that is coupled to a MEMS actuator to move the movable lens relative to the image sensor and the first and second fixed lens groups in an auto focus operation of the camera module, wherein the MEMS actuator is disposed within the housing and fixedly aligned to the first fixed lens group and the second fixed lens group, wherein the first fixed lens group comprises a lens L1 and a lens L2, the movable lens comprises a lens L3, and the second fixed lens group comprises a lens L4 and a lens L5, the optical train further comprising:

a first optical stop provided on an image side of the lens L1; and second optical stops provided on a scene side of each of lenses L3, L4, and L5, wherein the second optical stop provided on the lens L3 is configured to move in tandem with the lens L3, and a memory storing processor readable code for programming the processor to perform an auto-focus operation.

6. An auto focus zoom camera module, comprising:

a camera module housing;

an optical train within the housing including a first fixed lens group, a second fixed lens group, and at least one movable lens disposed between the first and second fixed lens groups that is coupled to an actuator to move the movable lens relative to the first and second fixed lens groups, wherein the actuator is disposed within the housing and fixedly aligned to the first fixed lens group and the second fixed lens group, wherein the first fixed lens group comprises a lens L1 and a lens L2, the movable lens comprises a lens L3, and the second fixed lens group comprises a lens L4 and a lens L5, the optical train further comprising:

a first optical stop provided on an image side of the lens L1; and second optical stops provided on a scene side of each of lenses L3, L4, and L5, wherein the second optical stop provided on the lens L3 is configured to move in tandem with the lens L3;

an image sensor aligned with the optical train; and a memory storing processor-readable code for programming a processor to perform an auto focus zoom operation.

7. An auto focus zoom camera module, comprising:

a camera module housing;

an image sensor within the camera module housing;

an optical train within the camera module housing at least including a first fixed lens group nearest the image sensor, a second fixed lens group, and a movable lens group disposed between the first and second fixed lens groups that is coupled to a MEMS actuator configured to move the movable lens group relative to the image sensor and the first and second fixed lens groups in an auto focus zoom operation of the camera module, wherein the MEMS actuator is disposed within the housing and fixedly aligned to the first fixed lens group and the second fixed lens group, wherein the first fixed lens group comprises a lens L1 and a lens L2, the movable lens comprises a lens L3, and the second fixed lens group comprises a lens L4 and a lens L5, the optical train further comprising:

a first optical stop provided on an image side of the lens L1; and second optical stops provided on a scene side of each of lenses L3, L4, and L5, wherein the second optical stop provided on the lens L3 is configured to move in tandem with the lens L3.

8. The auto focus zoom camera module of claim 7, wherein the optical train comprises an even number of fixed lenses.

9. The auto focus zoom camera module of claim 7, wherein the MEMS actuator is formed with a polymeric material.

10. The auto focus zoom camera module of claim 7, wherein the first fixed lens group comprises a zoom lens that is disposed closest to the image sensor within the optical train.

11. The auto focus zoom camera module of claim 10, wherein the second fixed lens group is disposed along the optical path on the object side of the movable lens, wherein the first fixed lens group including said zoom lens is disposed on the sensor side of the movable lens.

12. The auto focus zoom camera module of claim 7, wherein lens diameters decrease from L1 to L3, and increase from L3 to L5, such that the movable auto focus lens (L3) has the smallest diameter of the five lenses (L1 -L5 from object end to image end of the optical train).

13. The auto focus zoom camera module of claim 12, wherein lens L1 comprises a meniscus lens.

14. The auto focus zoom camera module of claim 13, wherein lens L2 also comprises a meniscus lens.

15. The auto focus zoom camera module of claim 14, wherein the movable auto focus lens L3 comprises a bi-convex lens.

16. The auto focus zoom camera module of claim 15, wherein the lens L4 comprises a complex bi-concave lens.

17. The auto focus zoom camera module of claim 16, wherein the lens L5 comprises a complex meniscus lens.

18. The auto focus zoom camera module of claim 7, wherein the MEMS actuator is configured to move the lens L3 of the movable lens group relative to the image sensor and fixed lenses L1 and L2 of the first fixed lens group, and fixed lenses L4 and L5 of the second fixed lens group.

19. The auto focus zoom camera module of claim 18, wherein a range of movement of the lens L3 comprises approximately 50 µm to 350 µm.

20. The auto focus zoom camera module of claim 18, wherein a range of movement of the lens L3 comprises approximately 100 µm.

21. The auto focus zoom camera module of claim 18, wherein the optical train has been fabricated as a unitary component within the housing.

22. The auto focus zoom camera module of claim 21, wherein the housing comprises a screw thread permitting the focus of the camera to be set.

23. The auto focus zoom camera module of claim 21, wherein the optical train has been fabricated using passive and active alignment.

24. The auto focus zoom camera module of claim 23, wherein active alignment has been used between the MEMS actuator and the third fixed lens L4.

25. The auto focus zoom camera module of claim 18, wherein a spacing between L2 and L3 is within a range around approximately 100 µm to 300 µm, and the MEMS actuator moves the lens L3 along up to 90% of that spacing in an auto focus operation.

26. The auto focus zoom camera module of claim 18, wherein a spacing between L2 and L3 is within a range around approximately 190 µm, and the MEMS actuator moves the lens L3 along up to 90% of that spacing in an auto focus operation.

27. The auto focus zoom camera module of claim 18, wherein a spacing between L5 and the image sensor is within a range around approximately 500 µm to 1500 µm.

28. The auto focus zoom camera module of claim 18, wherein a spacing between L5 and the image sensor is within a range around approximately 900 µm.

29. The auto focus zoom camera module of claim 18, further comprising an infra red cut filter spaced from L5 within a range around 5 µm to 1000 µm.

30. The auto focus zoom camera module of claim 18, further comprising an infra red cut filter spaced from L5 within a range around approximately 250 µm.

31. A method of assembling an optical train for an auto focus zoom camera module that includes five lenses (respectively referred to as "L1"-"L5" from image to object), comprising:
  providing a first optical stop on an image side of L1;
  providing second optical stops on a scene side of each of L3, L4, and L5, wherein the second optical stop provided on L3 is configured to move in tandem with L3;
  coupling L1 to L2;
  coupling L3 to a MEMS actuator;
  coupling L4 to L5;
  coupling the L1/L2 lens pair to the L3/MEMS assembly; and
  coupling the L1/L2/L3/MEMS assembly to the L4/L5 lens pair, such that the MEMS actuator is disposed within the optical train and fixedly aligned to the L1/L2 lens pair and the L4/L5 lens pair.

32. An auto focus MEMS camera module, comprising:
  an image sensor,
  an autofocus module including a MEMS actuator that is configured to move at least one movable lens along an optical axis of the camera module in an auto focus operation, and
  a first fixed lens group nearest an object end of the optical path; and
  a second fixed lens group nearest the sensor end of the optical path and spaced from the first fixed lens group at least 100 microns to permit the at least one movable lens to move through an auto focus range of the MEMS camera module, and wherein the at least one movable lens is movable along the optical axis of the camera between the first and second fixed lens groups, and wherein the MEMS actuator is disposed within the housing and fixedly aligned to the first fixed lens group and the second fixed lens group, wherein the first fixed lens group comprises a lens L1 and a lens L2, the movable lens comprises a lens L3, and the second fixed lens group comprises a lens L4 and a lens L5, the optical train further comprising:
  a first optical stop provided on an image side of the lens L1; and
  second optical stops provided on a scene side of each of lenses L3, L4, and L5, wherein the second optical stop provided on the lens L3 is configured to move in tandem with the lens L3.

33. The auto focus MEMS camera module of claim 32, wherein the second fixed lens group is spaced from the first fixed lens group at least 190 microns to permit the at least one movable lens to move through an auto focus range of the MEMS camera module.

34. The auto focus MEMS camera module of claim 33, wherein the first and second fixed lens groups each comprise two or more fixed lenses that are fixed in position relative to the image sensor or camera housing or a rigid substrate or combinations thereof.

\* \* \* \* \*